(12) United States Patent
Brun-Cottan et al.

(10) Patent No.: US 11,620,190 B2
(45) Date of Patent: Apr. 4, 2023

(54) TECHNIQUES FOR PERFORMING BACKUPS USING HINTS

(71) Applicant: EMC IP Holding Company LLC, Hopkinton, MA (US)

(72) Inventors: Georges Brun-Cottan, Belmont, MA (US); Jehuda Shemer, Kfar Saba (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 38 days.

(21) Appl. No.: 17/236,757

(22) Filed: Apr. 21, 2021

(65) Prior Publication Data

US 2022/0342766 A1   Oct. 27, 2022

(51) Int. Cl.
*G06F 12/16* (2006.01)
*G06F 11/14* (2006.01)
*G06F 13/10* (2006.01)

(52) U.S. Cl.
CPC ........ *G06F 11/1458* (2013.01); *G06F 13/102* (2013.01); *G06F 2201/85* (2013.01)

(58) Field of Classification Search
CPC ............. G06F 11/1458; G06F 11/1448; G06F 11/1451; G06F 11/1453
USPC ......................................................... 714/6.3
See application file for complete search history.

(56) References Cited

U.S. PATENT DOCUMENTS

| | | | |
|---|---|---|---|
| 9,201,739 B1 * | 12/2015 | Bagchi | G06F 11/1469 |
| 9,690,501 B1 * | 6/2017 | Chopra | G06F 3/067 |
| 10,324,656 B1 * | 6/2019 | Zhao | G06F 3/064 |
| 10,409,495 B1 * | 9/2019 | Baruch | G06F 3/0608 |
| 10,474,367 B1 | 11/2019 | Mallick et al. | |
| 10,678,440 B2 | 6/2020 | Gokam et al. | |
| 2002/0065822 A1 * | 5/2002 | Itani | G06F 16/84 |
| 2009/0041230 A1 * | 2/2009 | Williams | G06F 11/1448 |
| | | | 707/999.204 |
| 2011/0282836 A1 * | 11/2011 | Erickson | G06F 16/27 |
| | | | 707/622 |
| 2012/0233417 A1 * | 9/2012 | Kalach | G06F 11/1453 |
| | | | 711/E12.103 |

(Continued)

OTHER PUBLICATIONS

Drew Tonnesen, et al, U.S. Appl. No. 16/043,483, filed Jul. 24, 2018, "Automated Decision Engine for Setting I/O Service Level Objectives for I/O Tagging".

*Primary Examiner* — Chae M Ko

(74) *Attorney, Agent, or Firm* — Muirhead and Saturnelli, LLC

(57) ABSTRACT

Processing I/O operations may include: receiving, at a data storage system, an I/O operation from a host, wherein the I/O operation is directed to a logical address and includes an I/O tag used in connection with performing data reduction processing for first data stored at the logical address; and performing processing to back up a data set including the first data stored at the logical address. The processing may include: sending, from the data storage system to a backup application, the data set and hints regarding the first data set, wherein the hints include a first hint determined in accordance with the I/O tag from the host; performing, in accordance with the hints, data reduction processing of the data set to generate a second data set; and storing the second data set on one or more backup storage devices.

21 Claims, 7 Drawing Sheets

(56) References Cited

U.S. PATENT DOCUMENTS

2021/0011623 A1* 1/2021 Fay ..................... G06F 12/0246
2021/0224379 A1* 7/2021 Pientka ................ G06F 21/568

* cited by examiner

TECHNIQUES FOR PERFORMING BACKUPS USING HINTS

BACKGROUND

Technical Field

This application generally relates to data storage.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for processing I/O operations comprising: receiving, at a data storage system, an I/O operation from a host, wherein the I/O operation is directed to a first logical address and includes a first I/O tag used in connection with performing data reduction processing for first data stored at the first logical address; and performing first processing to backup a first data set including the first data stored at the first logical address, wherein the first processing includes: sending, from the data storage system to a backup application, the first data set and one or more hints regarding the first data set, wherein the one or more hints include a first hint determined in accordance with the first I/O tag from the host; performing, in accordance with the one or more hints, data reduction processing of the first data set to generate a second data set; and storing the second data set on one or more backup storage devices. The first I/O tag may indicate a file extension or file type of a first file that includes the first data stored at the first logical address. The first hint may be determined in accordance with the first I/O tag, and wherein the first hint may indicate whether or not to perform at least one data reduction technique on any of the first data and a first plurality of data blocks of the first file included in the first data set. The first I/O tag may indicate the first file is any of an audio file, a multimedia file, a video file, and an image file. The first hint may indicate not to compress the first data stored at the first logical address if the first I/O tag denotes the first file is an audio file, a multimedia file, a video file, or an image file. The first hint may indicate not to compress a first plurality of data blocks of the first file included in the first data set if the first I/O tag denotes the first file is an audio file, a multimedia file, a video file, or an image file. The first I/O tag may indicate that the first data stored at the first logical address is encrypted. The first hint may indicate not to compress a first plurality of data blocks of the first file included in the first data set. The first hint may indicate not to perform data deduplication processing of a first plurality of data blocks of the first file included in the first data set.

In at least one embodiment, the data storage system may include compression information. The compression information may include a first compression ratio for the first data. The first compression ratio may be less than a specified minimum compression ratio, and the first hint may indicate not to compress the first data. The compression information may include a first compression ratio for the first data, wherein the first compression ratio may be greater than or equal to a specified minimum compression ratio, and wherein the first hint may then indicate to compress the first data.

In at least one embodiment, processing may include receiving, at a data storage system, a second I/O operation from a host, wherein the second I/O operation is directed to a second logical address and includes a second I/O tag used in connection with performing data reduction processing for second data stored at the second logical address. The first processing may further include: determining that the first I/O tag and the second I/O tag indicate, respectively, that the first data and the second data are stored in two different files having a same file type or a same file extension, wherein the two different files are included in the first data set; and providing a second hint in the one or more hints from the data storage system to the backup application, wherein the second hint indicates to perform data deduplication between the two different files. The second hint may indicate to perform variable block deduplication with respect to the two different files. The second hint may include a deduplication segment length determined by the data storage system, and wherein the deduplication segment length may denote a length of a variable segment used in connection with performing variable block deduplication with respect to the two different files.

In at least one embodiment, the first I/O tag may indicate a first of a plurality of compression algorithms to be used when compressing the first data and wherein the host selects the first compression algorithm in accordance with characteristics of the first data.

In at least one embodiment, processing may include: sending the second data set and second one or more hints to a data archive system, wherein the second or more hints includes a second hint indicating that data reduction processing has been performed any on the second data set; and performing second processing of the second data set by the data archive system to generate a third data set stored on data archive devices, wherein the second processing uses the second hint to determine that a first data reduction technique has been applied to the second data set whereby, in response to the second hint, the data archive system omits performing the first data reduction technique on the second data set. The data reduction processing performed on the second data set may include any of compression processing and data deduplication processing.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
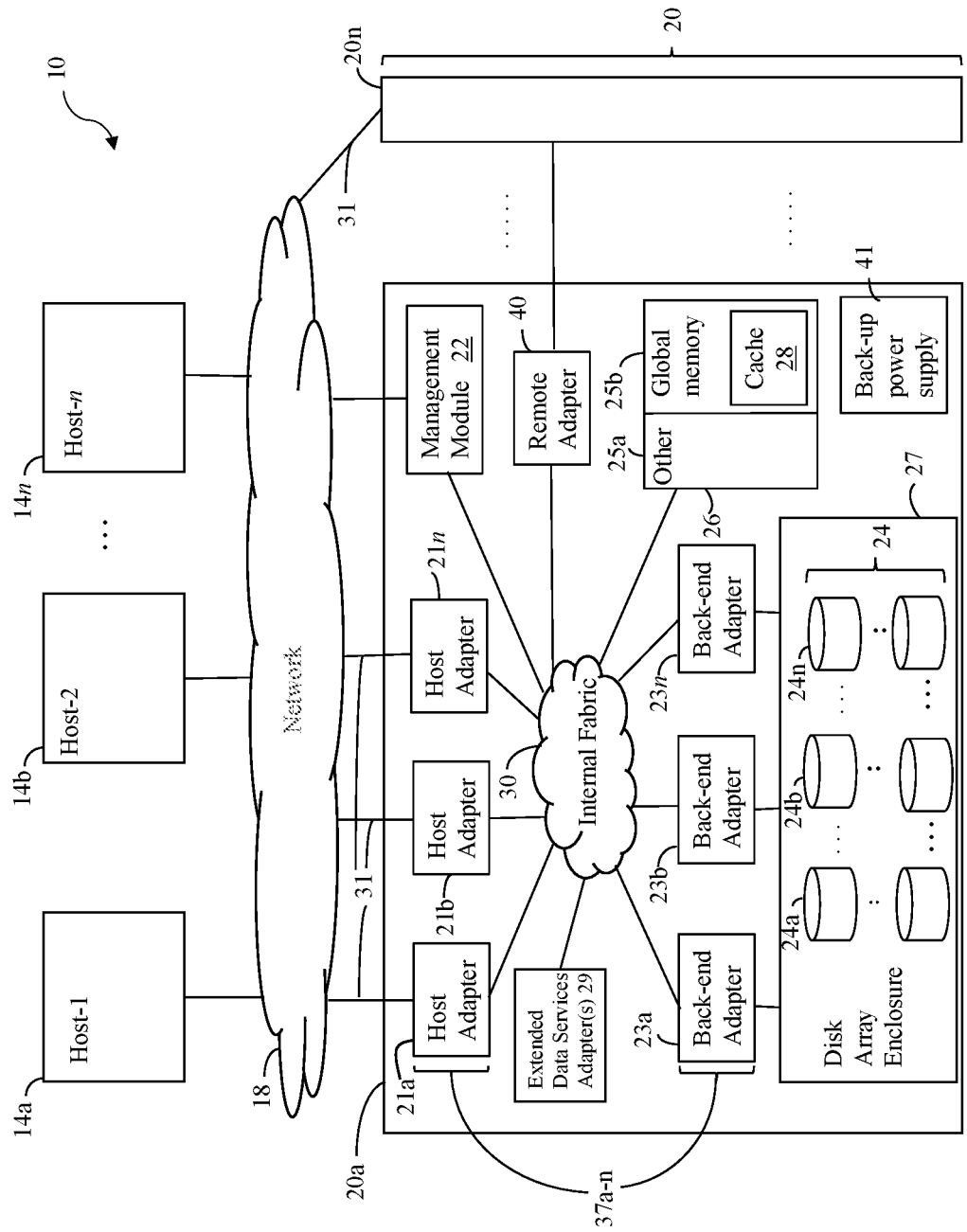
FIGS. 1 and 3 are diagrams illustrating examples of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe (Non-volatile Memory Express) over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include compute resources, for example, one or more CPUs cores for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP).

For example, the cache 28 may be partitioned into one or more portions called cache slots, which may be a of a predefined uniform size, for example, 128Kbytes. Write data of a write operation received at the storage system may be initially written (i.e., staged) in one or more of these cache slots and marked as write pending. Once written to the cache 28, the host (e.g., one of 14*a*-*n*) may be notified that the write operation has completed. At a later time, the write data may be de-staged from the cache 28 to one or more physical storage devices 24*a*-*n*, such as by a BEA.

When the data storage system receives a read I/O operation from the host, the data storage system may determine whether the requested read data needed to service the read I/O operation is in the cache 28. If so, processing determines a read cache hit has occurred whereby the requested read data is retrieved from the cache and returned to the host. If the requested read data is not in the cache, processing determines that a read cache miss has occurred. Responsive to the read cache miss occurring, the requested read data is retrieved from the BE PDs providing the non-volatile BE storage and stored in the cache. Subsequently, the read data (now stored in the cache) is read from the cache and returned to the requesting host.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20*a* may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20*a*-*n*, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14*a*-*n* may provide data and control (e.g., management and access control) information to the storage systems 20*a*-*n* over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
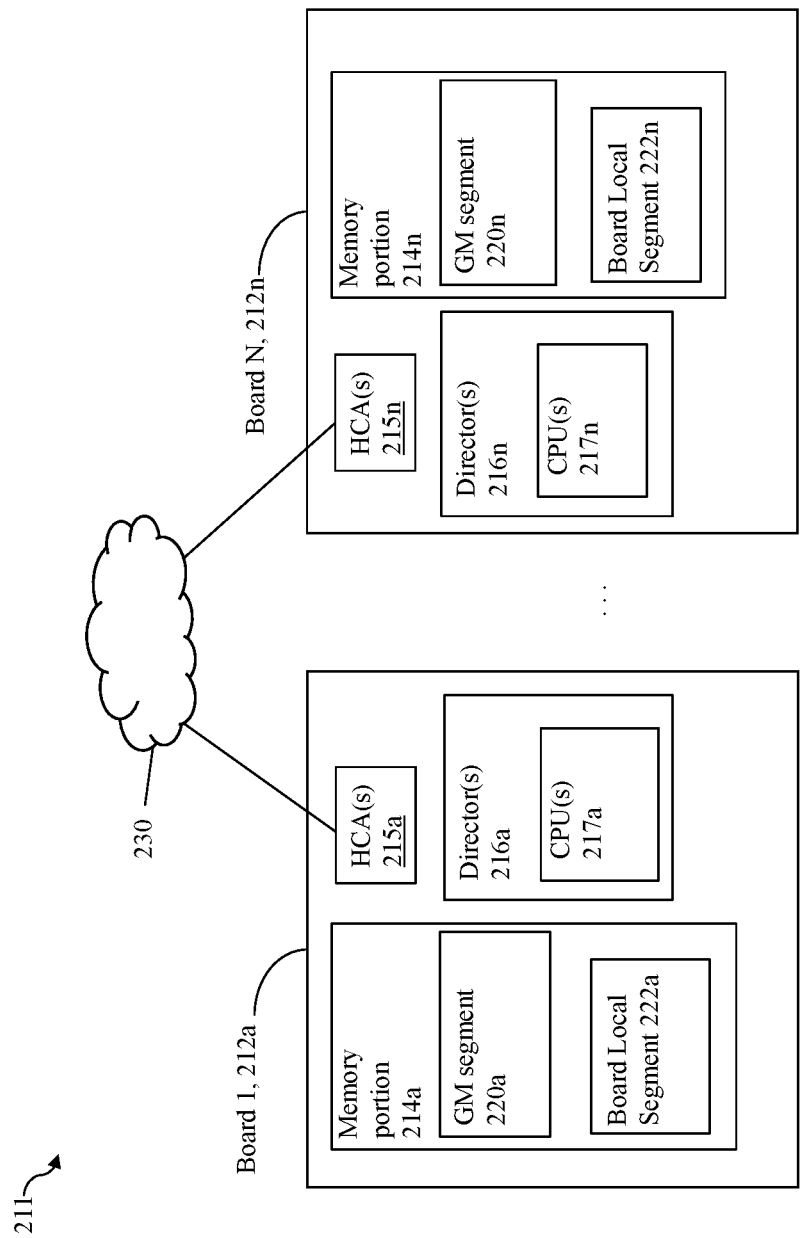
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20*a*) including multiple boards 212*a*-212*n*. The storage system 211 may include a plurality of boards 212*a*-212*n* and a fabric 230 (e.g., internal fabric 30) over which the boards 212*a*-*n* may communicate. Each of the boards 212*a*-212*n* may include components thereon as illustrated. The fabric 230 may include, for example, one or more switches and connections between the switch(es) and boards 212*a*-212*n*. In at least one embodiment, the fabric 230 may be an IB fabric.

In the following paragraphs, further details are described with reference to board 212*a* but each of the N boards in a system may be similarly configured. For example, the board 212*a* may include one or more directors 216*a* (e.g., directors 37*a*-*n*) and memory portion 214*a*. The one or more directors 216*a* may include one or more CPUs 217*a* including compute resources, for example, one or more cores or CPUs for processing I/O operations. One or more of the CPUs may be configured to function as one of the directors 37*a*-*n* described herein. For example, element 216*a* of board 212*a* may be configured to operate, such as by executing code, as any one or more of an FA, BEA, RA, and the like. In at least one embodiment, each of the directors may include a multicore CPU.

Each of the boards 212*a*-*n* may include one or more host channel adapters (HCAs) 215*a*-*n*, respectively, that physically couple, and are configured to enable communication between, the boards 212*a*-*n*, respectively, and the fabric 230. In some embodiments, the fabric 230 may include multiple (e.g., 2) switches, and each HCA 215*a*-*n* may have multiple (e.g., 2) ports, each one connected directly to one of the switches.

Each of the boards 212*a*-*n* may, respectively, also include memory portions 214*a*-*n*. The memory portion of each board may be characterized as locally accessible with respect to that particular board and with respect to other components on the same board. For example, the board 212*a* includes the memory portion 214*a* which is memory that is local to that particular the board 212*a*. Data stored in the memory portion 214*a* may be directly accessed by a CPU or core of a director 216*a* of the board 212*a*. For example, the memory portion 214*a* may be a fast memory (e.g., DIMM (dual inline memory module) DRAM (dynamic random access memory)) that is locally accessible by a director 216*a* where data from one location in 214*a* may be copied to another location in 214*a* directly using DMA (direct memory access)

operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with the techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
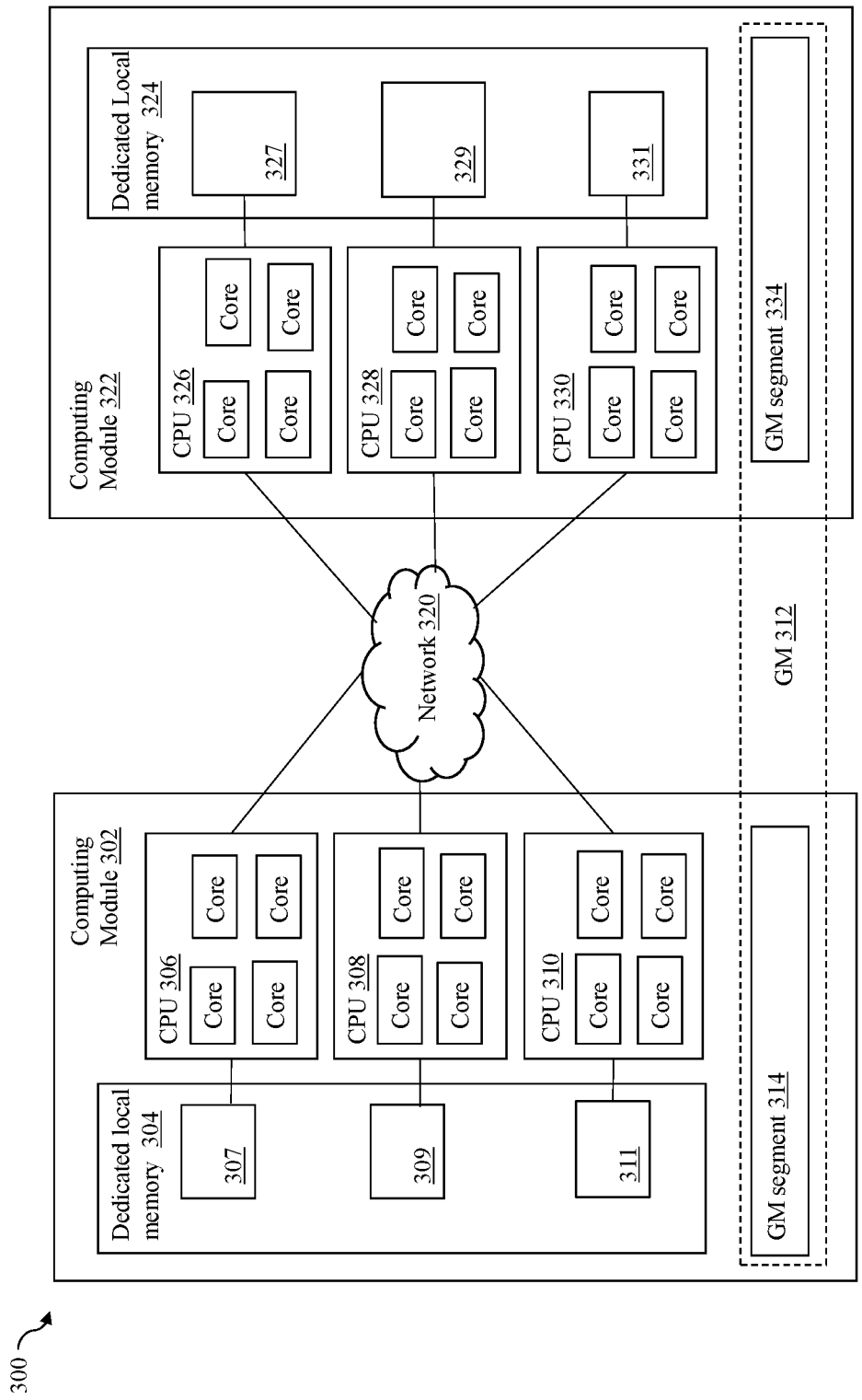
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
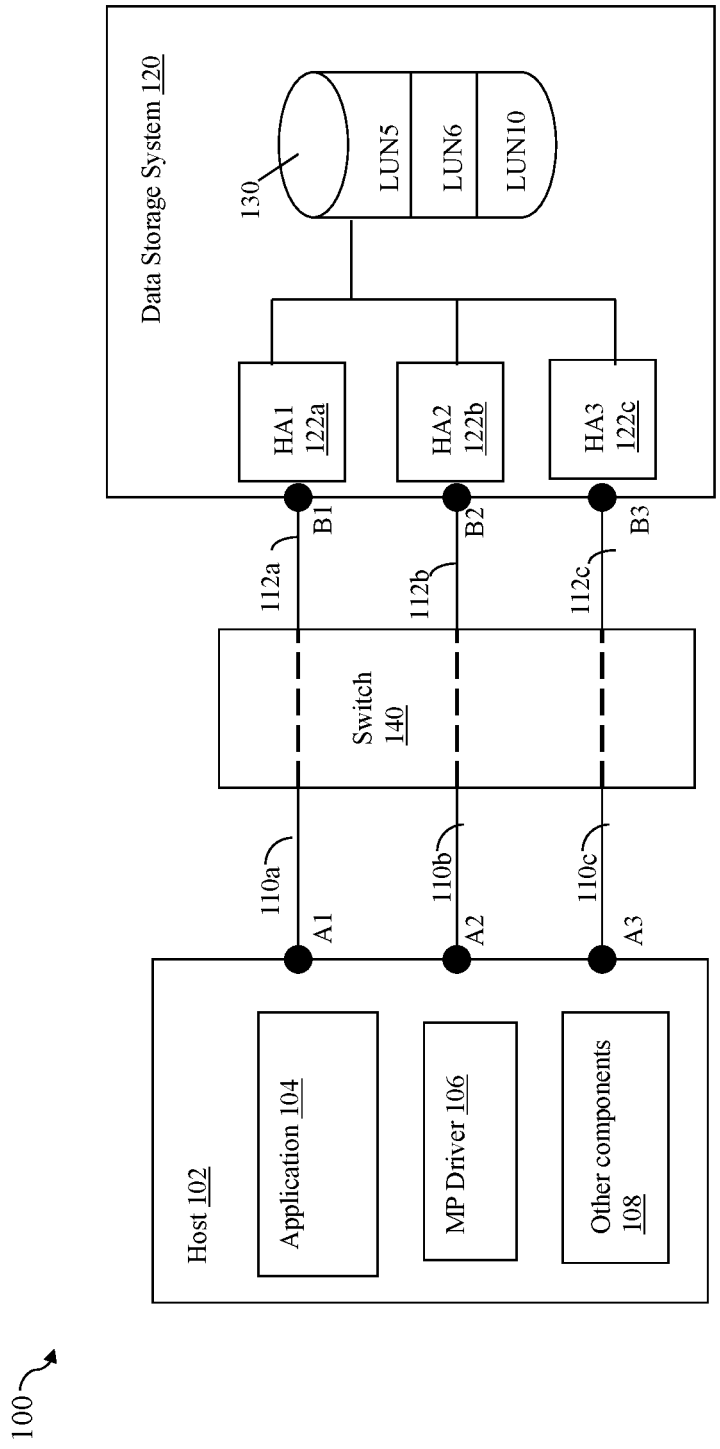

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and where multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin or virtually provisioned LUNs and thin or virtual provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Referring to FIG. 3, shown is an example of an embodiment of a system that may be utilized in connection with the techniques herein. The example 100 includes a host 102, a switch 140 and a data storage system 120. The host 102 and the data storage system 120 may communicate over one or more paths through the switch 140. The elements 110a-110c denote connections between the host 102 and the switch 140. The elements 112a-112c denote connections between the data storage system 120 and the switch 140. The element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths.

The MP driver 106 may include functionality to perform any one or more different types of processing such as related to encryption, multipathing, mirroring, migration, and the like. For example, the MP driver 106 may include multipathing functionality for management and use of multiple paths where, for example, the same set of one or more LUNs may be exposed over the multiple paths. For example, when the host needs to send an I/O directed to a LUN to the data storage system, the MP driver 106 may perform path selection to select one of the possible multiple paths over which the LUN is exposed based on one or more criteria such as load balancing to distribute I/O requests for the LUN or target device across available active paths to the LUN or target device. Load balancing may be performed to provide for better resource utilization and increased performance of the host, data storage system, and network or other connection infrastructure.

The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g., such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
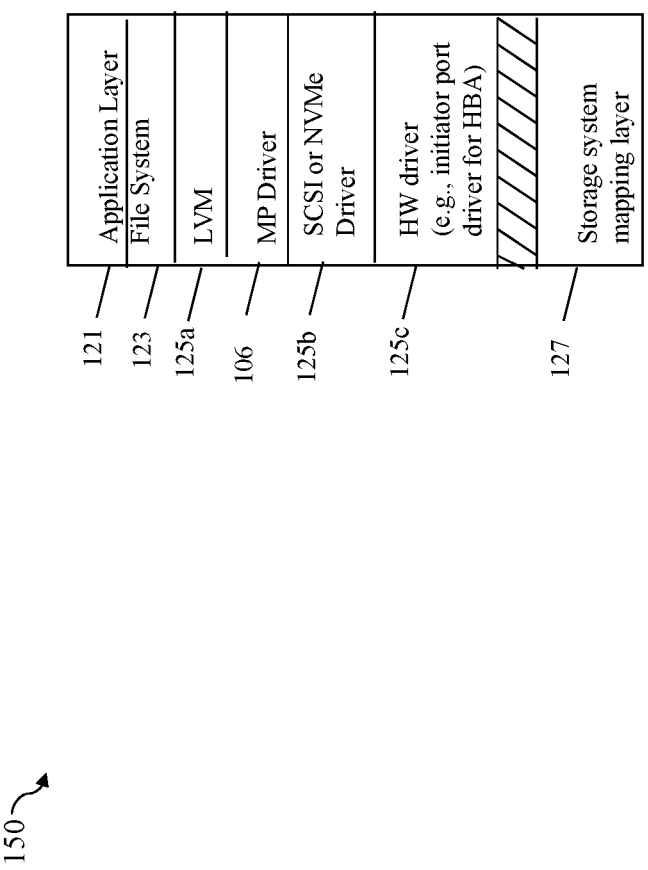
FIG. 4 is an example of a runtime stack associated with the data path or I/O path in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with the techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module.

As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator (or more specifically a host intiator port) through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

An embodiment in accordance with the techniques may perform one or more data services using data facilities. In at least one embodiment, the data services may be performed using data facilities on the data storage system. In at least one embodiment, the data services may include one or more data reduction techniques that provide for storing data on the non-volatile BE PDs provisioned for storing data of LUNs, or more generally LSUs configured on the data storage system. For example, the data storage system may perform one or more data reduction operations, such as data deduplication and/or data compression. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication techniques are known in the art and any suitable such technique may be used in an embodiment in accordance with the techniques herein. Data deduplication generally refers to removing redundant or duplicate data portions. Data deduplication techniques may include looking for duplicate data portions whereby only a single instance of the data portion is retained (stored on physical storage) and where pointers or references may be used in connection with duplicate or redundant copies (which reference or identify the single stored instance of the data portion).

In at least one embodiment, file-level deduplication may be performed which works at the file level by eliminating duplicate files.

In at least one embodiment, block level deduplication may be performed which works at a block level by eliminating duplicate blocks. Block level deduplication may further use fixed-size blocks (also sometimes referred to as fixed block deduplication or fixed block data deduplication) or variable-sized blocks (sometimes referred to as variable block deduplication or variable block data deduplication).

In at least one embodiment, fixed block data deduplication may be performed using fixed length chunks or segments that are compared to determine redundant fixed length segments. In this case, the original data set may be partitioned into segments or chunks that are all the same fixed length size, whereby processing may then be performed to determine which of the fixed length chunks or segments are identical. In at least one embodiment, performing fixed block deduplication, the block size may be 8K bytes, 16K bytes or 128K bytes.

In at least one embodiment, variable block data deduplication may be performed using variable length chunks or segments that are compared to determine redundant segments. In this case, the original data set may be partitioned into segments or chunks of varying lengths. With variable length deduplication, boundaries of the segments may be adjusted such that, for example, an insertion into the middle of the dataset may not prevent the remainder of the dataset from being deduplicated. Variable block deduplication includes using algorithms to determine a variable block size.

In at least one embodiment, the efficiency of data reduction techniques may be expressed using one or more metrics or statistics maintained and collected by the data storage system. For example, a compression ratio (CR) may be used to express the compressibility of data or the amount of data reduction achieved using data compression. A CR may be expressed as a ratio of the size of the original data with respect to the size of the compressed data (e.g., the size of the compressed form of the original data after compression processing). For example, a CR of 4:1 denotes that the compressed form of the data is approximately (e.g., within specified tolerances or bounds) ¼ the size of the original or uncompressed form of the data. As another example, a data deduplication ratio (DR) may be used to express the deduplicability of data or the amount of data reduction achieved using data deduplication. A DR may be expressed as a ratio of the size of the original data with respect to the size of the deduplicated data (e.g., the size of the deduplicated form of the original data after deduplication processing). For example, a DR of 5:1 denotes that the deduplicated form of the data is approximately (e.g., within specified tolerances or bounds) ⅕ the size of the original data.

In at least one embodiment, the statistics collected by the data storage system such as DRs and CRs, regarding data reduction achieved for particular data blocks may be obtained when performing data reduction processing at any suitable time. For example, compression and/or deduplication may be performed as part of processing when destaging write data from the cache to the BE PDs. The statistics may also be collected, for example, as a result of the data storage system running a background process that samples data stored on the BE PDs, performs compression and/or deduplication processing for the sampled data, and records statistics regarding the achieved compression and/or deduplication for the sampled data The sampling technique used by the background process to select data may be any suitable technique. The statistics may also more generally be determined using any suitable technique. For example, rather than actually perform compression processing, the statistics regarding compressibility or an expected compression ratio for data may be determined in accordance with a heuristic that predicts or provides an indication regarding an expected compression ratio or an expected amount of compression for a particular data portion. More generally, the statistics may provide an indication of whether or not to compress particular data portions. For example, it may be determined to compress a particular data portion if the particular data portion is expected to achieve at least a minimum threshold compression ratio or at least a minimum amount of compression. Otherwise, it may be determined not to compress the particular data portion.

In at least one embodiment, the data storage system may maintain statistics or metrics, such as the DRs and CRs, applicable to different data entities at varying levels of granularity. For example, DRs and CRs may be maintained for individual data blocks as well as for data sets or larger data entities comprising the individual data blocks. For example, DRs and CRs may be collected by the data storage system for individual data blocks, LUNs or other LSUs including the individual data blocks, data sets including the individual data blocks, and the like. The data sets may include, for example, at least one consecutive subrange or a portion of a logical address range of a LUN. The LBA subrange of a data set may denote, for example, a file system, a file or other logical entity including multiple data blocks, where the logical entity is mapped to the LBA subrange. The LBA subrange may be less than an entire logical address range of a LUN.

In some embodiments, the DRs and the CRs regarding a data set or portion of data may be estimates achieved using any suitable technique. For example, portions of a data set, such as selected LBAs of a LUN, may be compressed without compressing the entire data set, such as without compressing all LBAs of the LUN. The selected portions denoting a smaller subset of the entire data set may be compressed and the results of such compression of the subset may be used to obtain an overall CR that is attributed to the entire data set. The selected portions denoting a smaller subset of the entire data set may be deduplicated and the results of such deduplication may be used to obtain an overall DR that is attributed to the entire data set. To further illustrate, in at least one embodiment, the DR and/or CR of a data set may be determined in accordance with one or more DRs and/or CRs of individual data blocks of the data set. For example, the data storage system may perform compression processing of multiple data blocks in an LBA subrange of a LUN's logical address space. In this case, the data set may be the LBA subrange from 1-100 of the LUN. For example, the data storage system may perform compression processing for LBAs 1, 5, 10, 20, 30, 40, 60, and 100 and may determine a CR for each of the foregoing individual LBAs. The CRs determined individually for the foregoing LBAs may be collectively considered for a data set with the LBA subrange from 1 to 100. For example, the CRs for the foregoing LBAs may all fall within a specified CR range such as 3.0+/−a specified tolerance or threshold. The CRs of the individual blocks may be combined in any suitable manner to determine a collective or aggregate CR for the data set, for example, by determining an average CR for the data set based on the average of the CRs of the selected individual blocks of the data set. In this example, a CR for the LBA subrange denoting a data set may be determined as 3.0 based on the CRs of the foregoing few individual blocks in the data set. More generally, an embodiment may use any suitable technique for determining a CR for a larger data set in accordance with CRs of less than all individual blocks in the data set. In a similar manner, the DRs of the individual blocks may be combined to determine a collective or aggregate DR for the data set, for example, by determining an average DR for the DRs of the selected individual blocks. More generally, an embodiment may use any suitable technique for determining a DR for a larger data set in accordance with DRs of less than all individual blocks in the data set. In connection with a DR determined for a data set, the DR may be used as an estimate regarding an expected DR for any block or portion within the data set. For example, for the LBA subrange from 1-100 noted above, a DR of 3.0 may be used as a DR for all blocks or LBAs in the LBA subrange, where an average DR of 3.0 may be determined from the DRs of the selected individual data blocks in the LBA subrange.

For a given data set or data portion, the DR may be determined with respect to the deduplication achieved independently for the data set or portion without considering deduplication dependencies on other data sets or portions. For example, the DR for a data set or block may be determined by performing deduplication on data of the single data set or block to look for redundant data within the single data set or block. As a variation, a DR of a data set or block may be determined when considering redundant data with respect to one or more other multiple data sets or blocks. For example, the DR may be determined when considering redundant data where data deduplication is performed across or among two or more data sets or two or more data blocks. For example, a first data set or block may independently have a DR of 1:1 indicating that the first data set or block does not include any redundant data. However, the first data set or block may be almost a complete duplicate of a second different data set or block whereby the DR of the first data set or block in combination with the second data set or block may be approximately 2:1. In this latter case, the DR may be characterized as expressing a data deduplication ratio dependent on the combination of the two data sets or blocks. In this latter case, the DR may be expressed with respect to the two or more data sets or blocks that result in achieving the DR and may be used to denote whether to perform deduplication on the particular two or more data sets or blocks in combination rather than each data set individually.

In at least one embodiment, the data storage system may use the statistics or metrics, such as the DRs and/or the CRs for data blocks and/or data sets in connection with determining whether or not to perform data reduction processing for data stored at a logical address. For example, at a first point in time T1, the data storage system may receive a write I/O that writes first data to a first logical address. The data storage system may perform compression processing and obtain a compression ratio, CR1, for the first data. The CR1 for the first data may be below a minimum threshold thereby denoting that the first data did not achieve at least a minimum amount of compressibility as denoted by the minimum threshold. The data storage system may determine that the first data stored at the first logical address is not worth storing in its compressed form since at least the minimum amount of compressibility denoted by the minimum threshold is not achieved. Additionally, subsequent writes to the same first logical address at subsequent points in time may use the CR1 as a hint in connection with determining whether or not to compress the data written to the same first logical address. In at least one embodiment, the data storage system may determine not to compress the data written to the same first logical address for such subsequent writes, whereby the data written may be stored in its original uncompressed form. Since the characteristics of the data stored at various logical addresses, such as the first logical address, may change over time as additional write I/Os write new data to the first logical address, the data storage system may periodically reassess whether to compress data stored at the first logical address. For example, after a specified amount of time or a specified number of writes, the data storage system may again perform compression processing for data stored at the first logical address to determine a revised value for CR1 based on the latest or most recent data stored at the first logical address. In this manner, the data storage system may use the revised value for CR1 as a hint in connection with determining whether or not to perform compression processing for data stored at the first logical address and whether or not to store compressed or uncompressed data at the first logical address.

In a similar manner for deduplication processing, consider the write I/O received by the data storage system at the time T1 noted above, where the write I/O writes first data to the first logical address. The data storage system may perform data deduplication processing and obtain a deduplication ratio, DR1, for the first data stored at the first logical address. The DR1 for the first data may be below a minimum threshold thereby denoting that the first data did not achieve at least a minimum amount of deduplication as denoted by the minimum threshold. The data storage system may determine that the first data stored at the first logical address is not worth storing in its deduplicated form since at least the minimum amount of deduplication denoted by the minimum threshold is not achieved. Additionally, subsequent writes to the same first logical address at subsequent points in time may use the DR1 as a hint in connection with determining whether or not to deduplicate the data written to the same first logical address. In at least one embodiment, the data storage system may determine not to deduplicate the data written to the same first logical address for such subsequent writes, whereby the data written may be stored in its original form. Since the characteristics of the data stored at various logical addresses, such as the first logical address, may change over time as additional write I/Os write new data to the first logical address, the data storage system may periodically reassess whether to deduplicate data stored at the first logical address. For example, after a specified amount of time or a specified number of writes, the data storage system may again perform deduplication processing for data stored at the first logical address to determine a revised value for DR1 based on the latest or most recent data stored at the first logical address. In this manner, the data storage system may use the revised value for DR1 as a hint in connection with determining whether or not to perform deduplication processing for data stored at the first logical address and whether or not to store data at the first logical address in its deduplicated form.

Referring back to FIGS. 3 and 4, an application may issue an I/O operation, such as a read or write operation, to a file. Consistent with other discussion herein such as illustrated by the data path or I/O path runtime stack of FIG. 4, the I/O directed to the file may be mapped to an I/O directed to a target logical address, such as a LUN and LBA. The LUN and LBA may be included in the logical address space of the LUN allocated for use in storing data of the file.

In at least one embodiment in accordance with the techniques herein, I/O tagging may be performed for I/Os sent from the host to the data storage system. In at least one embodiment, the MP driver may tag individual I/Os, such as each read and/or write operation, sent from the host the data storage system with one or more tags. The one or more tags of an I/O operation may be included, for example, in the I/O operation's command data block (CDB). The tag (sometimes also referred to as an I/O tag) may generally be any suitable information usable as a hint in connection with processing the I/O operation or the data that is read or written by the I/O operation. For example, the I/O operation may read or write data at a target logical address, where the hint of the I/O operation may relate to the data stored at the target logical address. The tag of an I/O operation may be used by the data storage system as well as possibly other systems and components that may perform services or operations in connection with the data storage at the target logical address.

The data storage system may save the tags as hints, for example, for each data block or other storage unit granularity stored at a logical address. The data storage system may use the tags denoting hints for individual data blocks stored at LUN LBAs when performing services, such as data reduction, or more generally processing the data stored at the LBAs. For example, the tag of an I/O operation directed to a logical address may provide a hint regarding whether the data stored as the logical address is compressible or should be compressed. In this manner, the hint may be used by the data storage system to determine whether or not to perform compression processing of the data stored at the logical address. For example, the tag of an I/O operation directed to a logical address may provide a hint regarding whether the data stored as the logical address is dedupable or should be deduplicated. In this manner, the hint may be used by the data storage system to determine whether or not to perform deduplication of the data stored at the logical address.

In at least one embodiment, the MP driver of the host may include a tag in an I/O operation sent to the data storage system based on information available to the MP driver. The information available and used by the MP driver when determining one or more tags of an I/O operation may include the file name as well as the file extension portion of the file name. In at least one embodiment, the tag of an I/O operation may indicate the file extension or suffix of the file name including the data that is read from, or written to, by the I/O operation. For example, the I/O may be a write operation that writes data to a logical address. The write I/O operation may include a tag denoting the file extension of the file that includes the data stored at the logical address of the write I/O operation. The data storage system may save this tag and associate this tag with the particular logical address of the write I/O operation. The data storage system may use this tag as a hint in connection with performing data reduction services or processing of data stored at the particular logical address. The data storage system may use this tag denoting the file extension of the write operation to determine whether to perform compression processing and/or whether to perform data deduplication processing on the data written to the logical address of the write operation. For example, the write I/O may write data to an MP3 file, where MP3 is the file extension. MP3 files are audio files in accordance saved in a compressed audio format developed by the Moving Picture Experts Group (MPEG) that uses "Layer 3" audio compression (MP3). MP3 files may generally include audio content such as, for example, music, a lecture, audiobook, pod cast, and the like. Thus, MP3 files have content that has been compressed by a "lossy" audio data compression algorithm and there may not be additional compression benefit obtained by further compressing an MP3 file using a data compression technique. As such, the data storage system may use the I/O tag of the write I/O denoting the MP3 file as a hint in connection with compression processing and may determine not to perform compression processing of data stored at the logical address of the write I/O operation. The data storage system may also use the I/O tag of the write I/O denoting the MP3 file as a hint in connection with deduplication processing and may determine not to perform deduplication processing of data stored at the logical address of the write I/O operation.

As another example, the I/O tag of an I/O operation may indicate that the file extension is a video file or an image file. For example, the tag may indicate that the file extension is JPEG (Joint Photographic Experts Group) or JPG denoting an image file stored in a standard image format for lossy and compressed image data. As another example, the tag may indicate a file extension, such as MP4, denoting a multimedia file that may be used to store audio, video and/or image data in a standard format that has been compressed using a lossy compression technique. As such, the data storage system may use the I/O tag denoting the video or image file as a hint in connection with compression processing and may determine not to perform compression processing of data stored at the logical address of the I/O operation including the I/O tag denoting an image file or a video file. The data storage system may use the I/O tag denoting the video or image file as a hint in connection with deduplication processing and may determine not to perform data deduplication processing of data stored at the logical address of the I/O operation including the I/O tag denoting an image file or a video file.

Thus generally in at least one embodiment, I/O tags of I/O operations may denote file extensions or types (e.g., MP3, MP4, JPEG, MPEG) for any one or more of the following: image files, multimedia files, audio files, and video files. In at least one embodiment, the file extensions or types may be predetermined and known. Files having such file extensions or types may be expected or known to have been compressed, processed and more generally expected to contain data that is not expected to result in further data reduction as a result of performing compression processing and/or data deduplication processing individually on data of the file. As such, for received I/O operations directed to target logical addresses where the received I/O operations also include I/O tags denoting any such file extensions or types, the data storage system may use the I/O tags denoting any such file extensions or types as hints in connection with determining not to compress data stored at the target logical addresses. Additionally, the data storage system may use the I/O tags denoting any such file extensions or types as hints in connection with determining not to deduplicate data stored at the target logical addresses.

In at least one embodiment, an I/O tag of an I/O operation directed to a logical address may indicate whether the data stored at the logical address is encrypted or not. In at least one embodiment, if the I/O tag indicates that the data stored at the logical address is encrypted, then the data storage system may use the I/O tag as a hint in connection with determining whether or not to perform data reduction processing on the data of the logical address. In at least one embodiment, if the I/O tag indicates that the data stored at the logical address is encrypted, then the data storage system may determine not to perform data deduplication processing of the data and may also determine not to perform compression of the data. Consistent with other discussion herein, deduplication generally looks for patterns of similar blocks or files. In contrast, encryption randomizes the data thus eliminating or reducing any such patterns in the data. As such, it may be expected that the data deduplication processing will not find any data to duplicate in encrypted data. Additionally, encrypted data may be characterized as similar to random data that is generally not expected to result in very good compressibility.

In some embodiments, in a manner similar to that as described herein regarding CRs and DRs, the I/O tags and hints of individual blocks included in a larger data set or portion of data may be used as hints applicable to the entire larger data set or portion. Tags may be received from the host in connection with I/Os written to individual data blocks included in a larger data set. For example, the I/Os may be directed to individual LBAs of a LUN. The tags of the I/Os may be used in connection with providing hints used in connection with performing data reduction with respect to data stored at the individual LBAs to which the I/Os are directed. Additionally, the hints may also be used in connection with performing data reduction with respect to data stored at LBAs of the entire LUN or a subrange of the LUN including the LBAs. For example, tags may be received for I/Os directed to the LBAs 1, 5, 10, 20 and 100 of the LUN. All such tags may indicate the same file extension or type thereby indicating that data stored at the LBAs 1, 5, 10, 20 and 100 of the LUN are all included in one or more files having the same extension or type. For example, the tags of all the foregoing I/Os may indicate a file extension or type such as MP3. The data storage system may further extend and apply the file extension or type denoted by the tags of the foregoing individual LBAs as a hint for the entire LBA subrange from 1-100. In this manner, the hints received for less than all LBAs of the LBA subrange 1-100 may be used to determine hints for LBA subrange. Hints for data portions denoting a smaller subset of an entire data set may be used to obtain one or more hints that are attributed to the entire data set. In connection with the foregoing example, the hints may be used to determine not to perform compression for any data stored in the LBA subrange 1-100, and also not to perform data deduplication for any data stored in the LBA subrange 1-100. As yet another example, tags may be received for I/Os directed to the LBAs 1, 5, 10, 20 and 100 of the LUN as noted above. All such tags may indicate that the data stored at the foregoing LBAs is encrypted. The data storage system may further extend and apply the encrypted I/O tags of the foregoing individual LBAs as a hint for the entire LBA subrange from 1-100.

In at least one embodiment in accordance with the techniques herein, the data storage system may further provide hints to other additional external components, systems, applications and/or facilities. The hints provided by the data storage system may be used in connection with data reduction processing that may be performed by such external components, systems, applications and/or facilities. For example, in at least one embodiment, the data storage system may provide hints to a backup application, facility, system or appliance that performs data reduction processing on a data set prior to storing a backup of the data set on backup data storage devices.

In at least one embodiment, the data storage system may use one or more source of information to determine the hints provided to the backup application. In at least one embodiment, one source of information used to determine the hints may include the statistics or metrics collected regarding data reduction. The statics or metrics may include, for example, the DRs and/or CRs of the data blocks, data sets, and the like, as described elsewhere herein. In at least one embodiment, one source of information used to determine the hints may include the I/O tags embedded in I/Os sent from one or more hosts to the data storage system. Examples of the I/O tags used as hints by the data storage system are described elsewhere herein. In at least one embodiment, the DS may use the statistics regarding compressibility and deduplication and the I/O tags to provide hints to the backup application with the data sets to be backed up. The backup application may then use the hints to optimize the backup processing, for example, by determining whether to perform data reduction processing such as compression and/or deduplication, as part of the backup processing of the data set.

Figure 5:
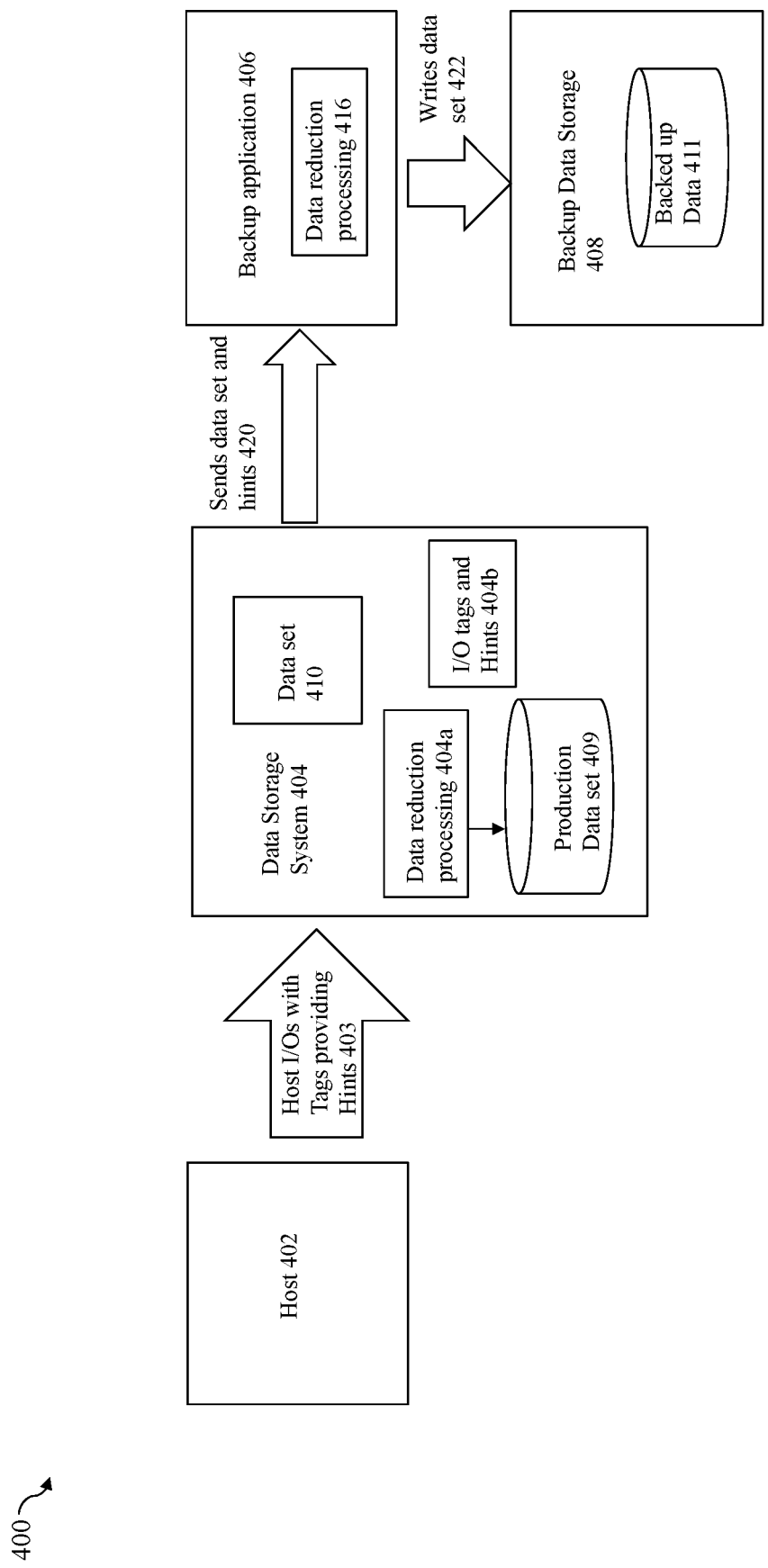
FIGS. 5 and 6 are examples of components and associated data processing flows in an embodiment in accordance with the techniques herein.

Referring to FIG. 5, shown is an example of components that may be used in at least one embodiment in accordance with the techniques herein. The example 400 further illustrates an associated data flow in connection with the components in at least one embodiment in accordance with the techniques herein.

The example 400 includes a host 402, a data storage system 404, a backup application 406, and backup data storage 408. The host 402 and the data storage system 404 may be as described in more detail elsewhere herein. The backup application 406 may generally represent any suitable software that performs processing to backup a received data set. The backup application 406 may perform processing of the received data set to be backed up whereby the data set is subsequently written (422) and stored on the backup data storage 408. The backup data storage 408 may generally include physical storage devices for storing the backed up data 411.

As discussed in more detail in following paragraphs, the components of FIG. 5 may be used to provide hints to the backup application 406 for use in connection with the data reduction processing 416 performed by the backup application 406.

As discussed above, the data storage system 404 may perform data reduction processing 404a of data that may be stored on BE PDs of the data storage system 404. For example, the production data set 409 may denote a production data set that is online and in use by the host 402. The production data set 409 may be stored on the BE PDs of the data storage system 404. The production data set 409 may denote data included in one or more LUNs where the host 402 may issue I/Os, such as to read data from and/or write data to, the production data set 409. More generally, the production data set 409 may be any suitable data set such as, for example, data stored on one or more LUNs, portions of one or more LUNs, one or more file systems, one or more files, or one or more logical entities or storage objects. The data reduction processing 404a may include a compression processing component and/or a data deduplication component that, respectively, perform compression and data deduplication processing of data stored on the BE PDs of the system 404. For example, the data reduction processing 404a may perform compression and/or data deduplication processing of data included in the production data set 409 stored on the BE PDs of the system 404.

In at least one embodiment, the data reduction processing 404a may be performed when destaging data from the cache of the system 404 to the BE PDs of the system 404. Additionally, for data stored on the BE PDs of the system 404 in compressed or deduplicated form, the reverse of such data reduction processing may be performed when reading data from the BE PDs and then storing the data read into the cache of the system 404. For example, if first data from the production data set 409 is stored on the BE PDs of the system 404 in a compressed form, the first data is decompressed when reading the first data from the BE PDs, for example, such as to service a read I/O from the host 402. For example, if first data from the production data set 409 is stored on the BE PDs of the system 404 in a deduplicated form, the original form of the first data is reconstructed when reading the first data from the BE PDs, for example, such as to service a read I/O from the host 402.

In at least one embodiment, the data reduction processing 404a may also be performed at other times in addition to when destaging data from the cache of the system 404 to the BE PDs of the system 404. For example, as discussed elsewhere herein, in at least one embodiment, a background process may be executed that triggers the data reduction processing 404a for data stored on the BE PDs of the system 404. The background process may trigger the data reduction processing 404a, for example, when the data storage system is idle or has a low workload in order to sample stored data and obtain statistics, such as CRs and/or DRs, for data stored on the BE PDs of the system 404.

The data set 410 may denote the data set to be backed up by the backup application 406 to the backup data storage 408.

In at least one embodiment, the backup application 406 may perform processing including data reduction processing 416. The data reduction processing 416 performed by the backup application 406 may be similar to the data reduction processing as described herein and also denoted by the element 404a of the system 404. The data reduction processing 416 performed by the backup application 406 may include, for example, data deduplication and/or compression processing as described herein.

In at least one embodiment, the backup application 406 and the backup data storage 408 may be included in the same system or appliance. As a variation in another embodiment, the components 406 and 408 may be included in different systems. The foregoing as well as other arrangements are possible. The backup application 406 may generally be any suitable backup application that accesses, reads or receives the data set 410 from the data storage system 404. The backup application 406 may generally use any suitable data push or data pull technique to obtain the data set 410 to be backed up from the system 404.

The data storage system 404 may generally use any suitable technique to obtain the data set 410 to be backed up by the backup application 406 and provide the data set 410 to the backup application 406. Generally, the production data set 409 is online and in use by the host 402. As such, any suitable technique may be used to obtain a copy of the production data set, or selected portions thereof, to be included in the data set 410 being backed up. In at least one embodiment, a snapshot or other technique may be used to obtain a copy of the production data set, or selected portions thereof, to be included in the data set 410 being backed up.

The data set 410 being backed up at a particular point in time may be determined based on the particular policies of the system 404 configured for the production data set 409. For example, the data set 410 to be backed up may be a complete or full backup of the production data set 409. As an alternative, the data set 410 to be backed up may be a differential backup that backs up only the files or blocks of the production data set 409 that have changed since the last or most recent full or complete backup. As yet another alternative, the data set 410 to be backed up may be an incremental backup that backs up only the data changes since the last or most recent full or incremental back up.

As noted above, the components of FIG. 5 may be used to provide hints to the backup application 406 for use in connection with the data reduction processing 416 performed by the backup application 406. Consistent with other discussion herein, the host 402 may issue 403 I/Os to the data storage system 404, where the I/Os include I/O tags used as hints by the data storage system 404 in connection with performing data reduction processing 404a. The data storage system 404 may store the I/O tags and any other hint information derived from the I/O tags in any suitable data store or container denoted by the element 404b. The element 404b may be, for example, a database (DB). In at least one embodiment, the information stored in the DB 404b may include the I/O tags of the I/O operations received (403) from the host 402. For example, the database 404b may include one or more tables of information denoting the I/O tag(s) received in connection with I/O operations directed to particular logical addresses. The DB 404b may also include additional hint information derived from the I/O tags. In at least one embodiment, the additional hint information derived from the I/O tags may include additional logical addresses for which received I/O tag is applied. For example, as discussed above, I/O tags denoting the same file extension or type may be received for several individual LBAs (e.g., LBAs 1, 5, 10, 20, 50, 100) included in an LBA subrange (e.g., 1-100) of a LUN. The data storage system may further extend or apply the file extension or type to all LBAs in the LBA subrange. In this manner, the extension of the I/O tag or hint to all LBAs in the subrange may result in additional hint information derived from the few received I/O tags for the several individual LBAs. The additional hint information included in the DB 404*b* may also include the data reduction statistics, such as CRs and/or DRs, for different data portions. The data portions may include, for example, individual data blocks or LBAs as well as LBA subranges of one or more LUNs.

During the backup process, the data storage system 404 sends (420) the data set 410 to be backed up to the backup application 406. Additionally, the data storage system 404 sends (420) hints to the backup application with the data set 410 to be backed up. The hints sent from the system 404 to the backup application are generally associated with the data blocks of the data set 410 to be backed up. The hints sent to the backup application 406 may be in accordance with the I/O tags and hint information included in the DB 404*b*. The hints provided to the backup application 406 may be in any suitable form and may include relevant portions of the I/O tags and hint information stored in the DB 404*b* associated with the data set 410 to be backed up. The backup application 406 may then use the hints included as part of 420 in connection with data reduction processing 416 performed by the application 406 during the backup operation to store the data set 410 on the backup data storage 408. For example, the hint included in 420 sent from the system 404 to the application 406 may include the file extension or type associated with a portion of the data blocks in the data set 410 to be backed up. Based on the hint, the data storage system 404 may have previously omitted or skipped data deduplication and compression processing when storing the first set of data blocks on BE PDs of the system 404. Now additionally the application 406 may use the file extension or type as a hint in connection with its data reduction processing 416 in a manner similar to that as described elsewhere herein by the data storage system 404 when performing data reduction processing 404*a*. For example, the backup application 406 may determine that the file extension or type included in the hints for a first set of data blocks to be backed up denotes an MP3 file extension or type denoting that the first set of data blocks has already been compressed. In response, the application 406 may omit or skip performing compression and data deduplication of the first set of data blocks. In this manner, the backup application 406 may optimize processing performed in connection with backing up the data set 410 by not trying to compress or deduplicate the first set of data blocks. As a result, resources used in connection with backing up the data set 410 may be reduced. For example, by omitting compression and deduplication of the first set of data blocks, CPU or processor time and memory required for performing such data reduction operations is not expended.

In at least one embodiment, the data storage system 404 may push the data set 410 and associated hints directly to the backup application 406. In such an embodiment, the data storage system 410 may embed the hints in commands sent to the backup application 406.

In addition to the I/O tags and other hint information described above that may be included in the DB 404*b* and used by the data storage system 404 in connection with data reduction processing, the information in the DB 404*b* may also include other statistics used to provide hints to the backup application 406 with associated data blocks to be backed up. In at least one embodiment, the DB 404*b* may include statistics regarding the different CRs obtained using different compression algorithms for the same data blocks or data sets. For example, the data storage system 404 may perform, as a background process, data compression using different compression techniques or algorithms on a set of one or more data blocks. For the set of one or more data blocks to be backed up, the hint sent from the system 404 to the backup application 406 may indicate the particular compression algorithm that is preferred and expected to result in the highest CR for each of the data blocks of the set thereby achieving the largest data reduction. The hint may indicate, for example, one or more parameters that may be preferred for a particular compression algorithm. The data storage system 404 may collect such statistics, for example, by running different compression algorithms on the same data set as a background task to obtain different CRs for the different compression algorithms used to compress the data set.

In at least one embodiment, the DB 404*b* may include a hint that is sent from the host 402 to the data storage system 404 regarding data characteristics or types of data stored in a particular LBA range corresponding to a data file. For example, the host 402 may know data characteristics or types of data stored in a particular file used by an application of the host 402. For example, a data file may have long repeated sequences, a data file may have a lot of zeroes, and the like. Based on the particular type of data or characteristics of the data stored in the file mapped to a particular LBA range, the host 402 may provide (403) a hint selecting a particular compression algorithm from among multiple candidate compression algorithms that may be used to compress the data. The data storage system 404 may use this hint to select the particular compression algorithm or select particular parameters to use with a compression algorithm used to process the data file on the system 404 as part of data reduction processing 404*a*. Additionally, the data storage system 404 may store in the DB 404*b* the hint regarding the particular compression algorithm for the data file stored at the particular LBA range. When the data file stored at the LBA range is to be backed up and its data sent (420) from the system 404 to the application 406, the system 404 may also sent the hint identifying the particular compression algorithm or particular parameters to be used with a compression algorithm when preparing the data file for backup. For example, the application 406 may use the hint in connection with selecting a particular compression algorithm from multiple candidate compression algorithms or in connection with setting parameters of acompression algorithm as part of the data reduction processing 416.

In at least one embodiment, the DB 404*b* may include a hint for one or more LBAs denoting a CR obtained when the system 404 previously processed the one of more data blocks stored at the one or more LBAs using a compression algorithm. The CR may have been below a specified minimum threshold thereby denoting that the or more data blocks are uncompressible or otherwise do not achieve at least a minimum amount of compression. In such an embodiment, when backing up the one or more data blocks of the one or more LBAs, the system 404 may provide a hint to the backup application 406 indicating that the one or more data blocks are not compressible or should not be compressed. In response, the application 406 may omit compression processing when performing data reduction processing 416 on the one or more data blocks to be stored on the backup data storage 408.

In at least one embodiment, the DB 404*b* may include a hint for one or more LBAs denoting a DR obtained when the system 404 previously processed the one of more data blocks stored at the one or more LBAs using a data deduplication algorithm. The DR may have been below a specified minimum threshold thereby denoting that the or more data blocks are not dedupable or otherwise do not achieve at least a minimum amount of deduplication. In such an embodiment, when backing up the one or more data blocks of the one or more LBAs, the system 404 may provide a hint to the backup application 406 indicating that the one or more data blocks are not dedupable or should not be deduplicate. In response, the application 406 may omit deduplication processing when performing data reduction processing 416 on the one or more data blocks to be stored on the backup data storage 408.

In at least one embodiment, the data storage system 404 may include hints with the data set 410 sent 420 to the backup application for backing up, where the hints denote the file extension or file type for data blocks of the data set 410. In at least one embodiment, the backup application 406 may use the file extension or type on two levels in connection with data reduction processing 416. First, consistent with other discussion herein, the backup application 406 may use the file extension or type to determine whether to perform deduplication with respect to data of a single LBA. For example, if the file type is MPEG or JPEG do not perform deduplication to look for duplicate blocks in the same LBA. Second, the backup application may use the file types of multiple files to determine whether to perform variable length deduplication with respect to the data of two or more LBAs. If two LBAs have the same type or file extension, such as both MPEG files, then data of the two LBAs may be candidates for variable length deduplication.

Consistent with other discussion herein, particular file extension or types, such as a JPEG or MPEG file, is already compressed and therefore it is unlikely there a repeated sequences within the same single file. When try to deduplicate using a standard fixed block size on an individual JPEG or MPEG file, compression processing and data deduplication processing may be omitted by both the data storage system 404 and the backup application. However, consider the case with two files having the same file extension or type, such as two MPEG or JPEG files, where the file extension or type indicates that data of the two files has already been compressed. In this latter case, the two files may be candidates for variable block deduplication performed with respect to the two files where processing is performed to locate deduplicate blocks or duplicate block sequences across both of the files. The data storage system may have determined based in I/O hints from the host, for example, that a first LBA range denotes a first set of blocks such as of a first file and a second different LBA range denotes a second set of blocks such as of a second file. In at least one embodiment, the data storage system may compare the two LBA ranges corresponding to two files, such as two different MPEG files, and perform a preliminary analysis to determine whether to recommend that the backup application 406 perform deduplication across the two files in combination. In at least one embodiment, the data storage system may perform preliminary analysis to determine whether performing data deduplication on the combination or union of the two files as a single unit results in a DR that is above a specified minimum threshold. If so, the data storage system may provide a hint to the backup application when backing up the data of the two LBA ranges corresponding to the two files where the hint indicates to perform data deduplication processing across the two LBA ranges in combination.

In at least one embodiment, the data deduplication processing performed by the backup application 416 as part of data reduction processing 416 may be variable block deduplication. In this case, the preliminary analysis performed by the data storage system may further include determining a sequence length to be used. The recommended sequence length may be included in the hint provided from the data storage system to the backup application when backing up the two LBA ranges corresponding respectively to the two MPEG files. The preliminary analysis performed by the data storage system may, for example, scan and compare corresponding sequential blocks of the two files from the same starting point or offset of the files to locate a first corresponding block of the first file that does not match the first corresponding block of the second file. For example, assume the starting file offset is 1, then processing may be performed to compare block 1 of file 1 to block 1 of file 2, compare block 2 of file 1 to block 2 of file 2, and so on, until processing reaches a first pair of corresponding blocks at position N of the 2 files that do not match. In this case, the data storage system may provide a hint to the backup application regarding the variable block length to be used of N−1 and the starting position in both files to use for determining the matching variable length segments.

In at least one embodiment, the data written by the host 402 when issuing write I/Os with hints 403 may be encrypted by the host 402. In such an embodiment, the data storage system 404 receives encrypted data from the host 402 and the system 404 may keep the data in its encrypted form. In such an embodiment, the data storage system 404 may, for example, store the encrypted data in the cache of the system 404 and on the BE PDs of the system 404. In other words, the system 404 may not decrypt the data written by the host such that the data remains in its encrypted form and is sent as encrypted data from the system 404 to the backup application 406 when backing up the encrypted data. In such an embodiment, a first I/O tag from the host 402 to the data storage system 404 may indicate that data payload of the write I/O includes encrypted data. As such the system 404 may use the first I/O tag as a hint in connection with data reduction processing 404a and determine not to compress and not to deduplicate the encrypted data. Subsequently, the first I/O tag may be sent as a hint indicating encrypted data when sending the encrypted data from the system 404 to the backup application 406 for backing up. As such the backup application 406 may use the first I/O tag as a hint in connection with data reduction processing 416 and determine not to compress and not to deduplicate the encrypted data. In this case, the encrypted data may be stored on the backup storage 408 without being compressed or deduplicated.

In at least one embodiment, whether the above-noted encrypted data is deduplicated or not by the backup application 406 may depend on whether the encrypted data is included in a full backup data set or is otherwise not included in a full backup data set (e.g., is rather included in a differential or incremental backup data set). In at least one embodiment, if the encrypted data sent from the system 404 to the application 406 for backing up is included in a full backup data set, then deduplication processing may be performed as part of data reduction processing 416 by the application 406. Otherwise, if the encrypted data sent from the system 404 to the application 406 for backing up is not included in a full backup data set, then deduplication processing may not be performed as part of data reduction processing 416 by the application 406. In such an embodiment, the system 404 may provide a hint with the encrypted data indicating whether the encrypted data is part of a full or complete backup data set. The application 406 may then use this hint denoting whether the encrypted data is part of a full backup set to determine whether to perform data deduplication processing as part of 416.

Generally, the components 402, 404, 406 and 408 may be characterized as a processing stream where hints may be passed up the stream between the components. Thus, the hints received by a component in the stream may denote the collective knowledge of hints of all upstream actors. For example, the hints passed from the system 404 to the application 406 generally denotes the collective hints passed down from the host 402 and the system 404.

In at least one embodiment, the data storage system 404 may perform data reduction processing on the data set 410 to be backed up so that the system 404 sends, for example, a compressed or deduplicated data set 410 from the system 404 to the application 406. The foregoing may be performed, for example, to reduce the size of the data set 410 transmitted from the sending system 404 to the receiving backup application 406. In such an embodiment, the system 404 may also include a hint with the compressed or deduplicated data set 410 to indicate that the data set 410 has been compressed or deduplicated. Assume that the data set 410 has been deduplicated whereby the deduplicated data set 410 is sent from the system 404 to the application 406 with a hint indicating the data set 410 has been deduplicated. In response, the application 406 may use the hint denoting deduplication to avoid or skip performing deduplication as part of the data reduction processing 416 when processing the received data set 410 that is subsequently stored on the backup data storage 408. Assume that the data set 410 has been compressed whereby the compressed data set 410 is sent from the system 404 to the application 406 with a hint indicating the data set 410 has been compressed. In response, the application 406 may use the hint denoting compression to avoid or skip performing compression processing as part of the data reduction processing 416 of the received data set 410 that is subsequently stored on the backup data storage 408.

Figure 6:
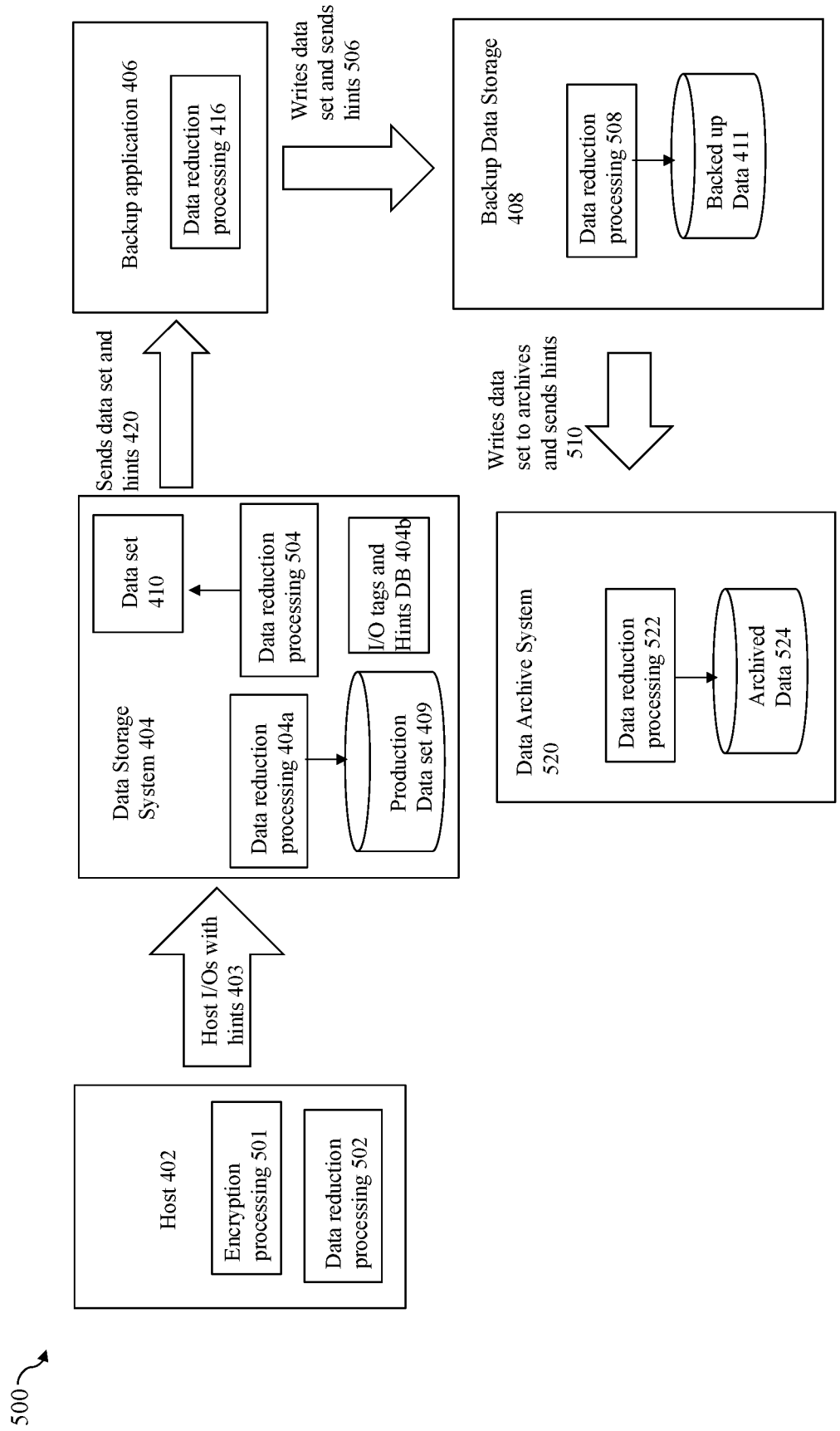

Referring to FIG. 6, shown is another example 500 of components that may be used in an embodiment in accordance with the techniques herein. The example 500 includes components as described in connection with FIG. 5 with a few differences. FIG. 6 includes an additional component, the data archive system 520, not included in FIG. 5. Additionally, in FIG. 6, each of the components 402, 404, 406, 408 and 520 may be capable of performing one or more data reduction techniques and the host 402 may be capable of performing encryption processing.

The data archive system 520 may be a system where backed up data sets may be further stored by the backup data storage 408. In at least one embodiment, the backed up data sets may be stored on the backup data storage 408 for a period of time, such as a month. Subsequently, based on the age of the backup data sets, the backup data sets may be migrated to the data archive system 520 based on policies of the systems and components of FIG. 6. For example, backup data sets older than a month may be written or relocated (510) from the backup data storage 408 to the data archive system 520, where the backup data set may be stored as archive data 524.

As noted above, each of the components 402, 404, 406, 408 and 520 may be capable of performing one or more data reduction techniques. Additionally, the host 402 may be capable of performing encryption processing 501. In such an embodiment, the data set passed between components may be in any of an encrypted and reduced form depending on the particular processing performed by upstream components. For example, if the host encrypts first data written by a write I/O operation that is sent to the data storage system 404, the first data may remain encrypted when transmitted from the host 402 to the system 404, when transmitted from the system 404 to the component 408, and when transmitted from the component 408 to the system 520. For example, if the data storage system performs data compression on first data to be backed up where the compressed first data is sent from the system 404 to the application 406, the compressed first data may be transmitted from the application 406 to the component 408, and from the component 408 to the system 520. As such, hints and an associated data set passed from a sending component to a receiving component may indicate whether any upstream component performed any particular data reduction technique on the transmitted data set. For example, if the host encrypts first data written by a write I/O operation that is sent to the data storage system 404, the encrypted first data and a hint indicating the first data is encrypted may be transmitted from the host 402 to the system 404, from the system 404 to the component 408, and from the component 408 to the system 520. For example, if the data storage system performs data compression on first data to be backed up, where the compressed first data and a hint indicating the first data is compressed may be sent from the system 404 to the application 406, from the application 406 to the component 408, and from the component 408 to the system 520.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
receiving, at a data storage system, an I/O operation from a host, wherein the I/O operation is directed to a first logical address and includes a first I/O tag used in connection with performing data reduction processing for first data stored at the first logical address; and
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address, and wherein the first I/O tag indicates that the first data stored at the first logical address is encrypted.

2. The method of claim 1, wherein the first hint is determined in accordance with the first I/O tag, and wherein the first hint indicates whether or not to perform at least one data reduction technique on any of the first data and a first plurality of data blocks of the first file included in the first data set.

3. The method of claim 1, wherein the first I/O tag indicates the first file is any of an audio file, a multimedia file, a video file, and an image file.

4. The method of claim 3, wherein the first hint indicates not to compress the first data stored at the first logical address if the first I/O tag denotes the first file is an audio file, a multimedia file, a video file, or an image file.

5. The method of claim 3, wherein the first hint indicates not to compress a first plurality of data blocks of the first file included in the first data set if the first I/O tag denotes the first file is an audio file, a multimedia file, a video file, or an image file.

6. The method of claim 1, wherein the first hint indicates not to compress a first plurality of data blocks of the first file included in the first data set.

7. The method of claim 1, wherein the first hint indicates not to perform data deduplication processing of a first plurality of data blocks of the first file included in the first data set.

8. The method of claim 1, wherein the data storage system includes compression information, wherein the compression information includes a first compression ratio for the first data, wherein the first compression ratio is less than a specified minimum compression ratio, and wherein the first hint indicates not to compress the first data.

9. The method of claim 1, wherein the data storage system includes compression information, wherein the compression information includes a first compression ratio for the first data, wherein the first compression ratio greater than or equal to a specified minimum compression ratio, and wherein the first hint indicates to compress the first data.

10. A method of processing I/O operations comprising:
receiving, at a data storage system, an I/O operation from a host, wherein the I/O operation is directed to a first logical address and includes a first I/O tag used in connection with performing data reduction processing for first data stored at the first logical address;
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address;
receiving, at the data storage system, a second I/O operation from the host, wherein the second I/O operation is directed to a second logical address and includes a second I/O tag used in connection with performing data reduction processing for second data stored at the second logical address; and wherein the first processing further includes:
determining that the first I/O tag and the second I/O tag indicate, respectively, that the first data and the second data are stored in two different files having a same file type or a same file extension, wherein the two different files are included in the first data set; and
providing a second hint in the one or more hints from the data storage system to the backup application, wherein the second hint indicates to perform data deduplication between the two different files.

11. The method of claim 10, wherein the second hint indicates to perform variable block deduplication with respect to the two different files.

12. The method of claim 11, wherein the second hint includes a deduplication segment length determined by the data storage system, and wherein the deduplication segment length denotes a length of a variable segment used in connection with performing variable block deduplication with respect to the two different files.

13. The method of claim 1, wherein the first I/O tag indicates a first of a plurality of compression algorithms to be used when compressing the first data and wherein the host selects the first compression algorithm in accordance with characteristics of the first data.

14. A method of processing I/O operations comprising:
receiving, at a data storage system, an I/O operation from a host, wherein the I/O operation is directed to a first logical address and includes a first I/O tag used in connection with performing data reduction processing for first data stored at the first logical address;
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices;
sending the second data set and second one or more hints to a data archive system, wherein the second one or more hints includes a second hint indicating that data reduction processing has been performed on the second data set; and
performing second processing of the second data set by the data archive system to generate a third data set stored on data archive devices, wherein the second processing uses the second hint to determine that a first data reduction technique has been applied to the second data set whereby, in response to the second hint, the data archive system omits performing the first data reduction technique on the second data set.

15. The method of claim 14, wherein the data reduction processing performed on the second data set includes any of compression processing and data deduplication processing.

16. A system comprising:
one or more processors; and
one or more memories comprising code stored thereon that, when executed, performs, a method of processing I/O operations comprising:

receiving, at a data storage system, an I/O operation from a host, wherein the I/O operation is directed to a first logical address and includes a first I/O tag used in connection with performing data reduction processing for first data stored at the first logical address; and performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address, and wherein the first I/O tag indicates that the first data stored at the first logical address is encrypted.

17. A non-transitory computer readable medium comprising code stored thereon that, when executed, performs a method of processing I/O operations comprising:
receiving, at a data storage system, an I/O operation from a host, wherein the I/O operation is directed to a first logical address and includes a first I/O tag used in connection with performing data reduction processing for first data stored at the first logical address; and
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address, and wherein the first I/O tag indicates that the first data stored at the first logical address is encrypted.

18. A non-transitory computer readable medium comprising code stored thereon that, when executed, performs a method of processing I/O operations comprising:
receiving, at a data storage system, an I/O operation from a host, wherein the I/O operation is directed to a first logical address and includes a first I/O tag used in connection with performing data reduction processing for first data stored at the first logical address;
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address;
receiving, at the data storage system, a second I/O operation from the host, wherein the second I/O operation is directed to a second logical address and includes a second I/O tag used in connection with performing data reduction processing for second data stored at the second logical address; and wherein the first processing further includes:
determining that the first I/O tag and the second I/O tag indicate, respectively, that the first data and the second data are stored in two different files having a same file type or a same file extension, wherein the two different files are included in the first data set; and
providing a second hint in the one or more hints from the data storage system to the backup application, wherein the second hint indicates to perform data deduplication between the two different files.

19. A system comprising:
one or more processors; and
one or more memories comprising code stored thereon that, when executed, performs a method of processing I/O operations comprising:
receiving, at a data storage system, an I/O operation from a host, wherein the I/O operation is directed to a first logical address and includes a first I/O tag used in connection with performing data reduction processing for first data stored at the first logical address;
performing first processing to backup a first data set including the first data stored at the first logical address, wherein the first processing includes:
sending, from the data storage system to a backup application, the first data set and one or more hints regarding the first data set, wherein the one or more hints include a first hint determined in accordance with the first I/O tag from the host;
performing, in accordance with the one or more hints, data reduction processing of the first data set to generate a second data set; and
storing the second data set on one or more backup storage devices, wherein the first I/O tag indicates a file extension or file type of a first file that includes the first data stored at the first logical address;
receiving, at the data storage system, a second I/O operation from the host, wherein the second I/O operation is directed to a second logical address and includes a second I/O tag used in connection with performing data reduction processing for second data stored at the second logical address; and wherein the first processing further includes:
determining that the first I/O tag and the second I/O tag indicate, respectively, that the first data and the second data are stored in two different files having a same file type or a same file extension, wherein the two different files are included in the first data set; and
providing a second hint in the one or more hints from the data storage system to the backup application, wherein the second hint indicates to perform data deduplication between the two different files.

20. A non-transitory computer readable medium comprising code stored thereon that, when executed, performs a method of processing I/O operations comprising:
receiving, at a data storage system, an I/O operation from a host, wherein the I/O operation is directed to a first logical address and includes a first I/O tag used in connection with performing data reduction processing for first data stored at the first logical address;

performing first processing to backup a first data set including the first data stored at the first logical address, wherein the first processing includes:
- sending, from the data storage system to a backup application, the first data set and one or more hints regarding the first data set, wherein the one or more hints include a first hint determined in accordance with the first I/O tag from the host;
- performing, in accordance with the one or more hints, data reduction processing of the first data set to generate a second data set; and
- storing the second data set on one or more backup storage devices;

sending the second data set and second one or more hints to a data archive system, wherein the second one or more hints includes a second hint indicating that data reduction processing has been performed on the second data set; and performing second processing of the second data set by the data archive system to generate a third data set stored on data archive devices, wherein the second processing uses the second hint to determine that a first data reduction technique has been applied to the second data set whereby, in response to the second hint, the data archive system omits performing the first data reduction technique on the second data set.

21. A system comprising:

one or more processors; and one or more memories comprising code stored thereon that, when executed, performs a method of processing I/O operations comprising:
- receiving, at a data storage system, an I/O operation from a host, wherein the I/O operation is directed to a first logical address and includes a first I/O tag used in connection with performing data reduction processing for first data stored at the first logical address;
- performing first processing to backup a first data set including the first data stored at the first logical address, wherein the first processing includes:
  - sending, from the data storage system to a backup application, the first data set and one or more hints regarding the first data set, wherein the one or more hints include a first hint determined in accordance with the first I/O tag from the host;
  - performing, in accordance with the one or more hints, data reduction processing of the first data set to generate a second data set; and
  - storing the second data set on one or more backup storage devices;
- sending the second data set and second one or more hints to a data archive system, wherein the second one or more hints includes a second hint indicating that data reduction processing has been performed on the second data set; and
- performing second processing of the second data set by the data archive system to generate a third data set stored on data archive devices, wherein the second processing uses the second hint to determine that a first data reduction technique has been applied to the second data set whereby, in response to the second hint, the data archive system omits performing the first data reduction technique on the second data set.

* * * * *